(12) United States Patent
Anderson

(10) Patent No.: US 10,054,137 B2
(45) Date of Patent: Aug. 21, 2018

(54) METERING CHECK VALVE

(71) Applicant: Parker-Hannifin Corporation, Cleveland, OH (US)

(72) Inventor: David John Anderson, Plymouth, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 262 days.

(21) Appl. No.: 14/955,492

(22) Filed: Dec. 1, 2015

(65) Prior Publication Data

US 2016/0153474 A1 Jun. 2, 2016

Related U.S. Application Data

(60) Provisional application No. 62/085,689, filed on Dec. 1, 2014.

(51) Int. Cl.
| | |
|---|---|
| *F15B 11/044* | (2006.01) |
| *F15B 13/02* | (2006.01) |
| *F15B 15/18* | (2006.01) |
| *F15B 15/02* | (2006.01) |
| *F16K 15/02* | (2006.01) |
| *F16K 15/18* | (2006.01) |

(52) U.S. Cl.
CPC .......... *F15B 13/027* (2013.01); *F15B 11/044* (2013.01); *F15B 15/18* (2013.01); *F16K 15/025* (2013.01); *F16K 15/185* (2013.01); *F16K 15/186* (2013.01); *F15B 2211/20561* (2013.01); *F15B 2211/3051* (2013.01); *F15B 2211/40584* (2013.01); *F15B 2211/785* (2013.01); *Y10T 137/7866* (2015.04); *Y10T 137/7867* (2015.04)

(58) Field of Classification Search
CPC ...... F15B 11/044; F15B 13/01; F15B 13/027; F15B 15/18; F15B 20/005; F15B 2211/20561; F15B 2211/3051; F15B 2211/40584; F15B 2211/785; F16K 11/02; F16K 15/025; F16K 15/185; F16K 15/186; F16K 17/196; Y10T 137/7866; Y10T 137/7867
See application file for complete search history.

(56) References Cited

FOREIGN PATENT DOCUMENTS

JP 2013104518 A * 5/2013 ............ F15B 13/027

OTHER PUBLICATIONS

Machine Translation of JP 2013104518 A to Matsuda et al., May 2013.*

* cited by examiner

*Primary Examiner* — Logan Kraft
(74) *Attorney, Agent, or Firm* — Renner, Otto, Boisselle & Sklar, LLP

(57) ABSTRACT

A check seat assembly includes a check valve seat with a by-pass passage in parallel with a check valve passage of the check seat assembly to meter flow and maintain stability of a hydraulic system, such as a hydraulic cylinder. The check valve may include an o-ring seated in a V-shaped groove. The check seat assembly may allow flow from a pump to a hydraulic cylinder to freely pass through the check valve to pressurize one side of a piston of the hydraulic cylinder, such as a front side of the piston to retract a corresponding rod connected to the piston.

22 Claims, 7 Drawing Sheets

METERING CHECK VALVE

RELATED APPLICATIONS

This application claims the benefit of U.S. Provisional Application No. 62/085,689 filed Dec. 1, 2014, which is incorporated herein by reference.

FIELD OF INVENTION

The present invention relates generally to check valves, and more particularly to metered check valves for hydraulic cylinders and actuators.

BACKGROUND

Hydraulic actuators are generally known. A typical hydraulic actuator includes a motor that drives a hydraulic pump to move fluid from a reservoir to a hydraulic cylinder for actuating a rod of the actuator. When the motor is driven in a first rotational direction, the hydraulic fluid moved by the hydraulic pump extends the rod. When the motor is driven in a second rotational direction, opposite to the first rotational direction, the hydraulic fluid moved by the hydraulic pump retracts the rod.

Depending on the configuration, the hydraulic cylinder may retract the rod to raise a load or extend the rod to lower the load. For example, the hydraulic cylinder may be disposed on a portion of a lawn mower and extend to lower a mower deck in a gull-wing motion. Due to the substantial weight of the load in such devices, as the load is lowered, the load tends to force the hydraulic cylinder to move faster than the hydraulic pump can provide flow to the hydraulic cylinder.

The lack of sufficient flow from the hydraulic pump may reduce pressure in a fluid flow path connected to a front side of the cylinder causing a corresponding poppet of a fluidly connected check valve to close against a seat of the check valve. Soon after the poppet closes the pump may re-pressurize the fluid causing the poppet to re-open to again lower the fluid pressure, which causes the poppet to re-close until the pump can re-pressurize the fluid. The repeated opening and closing of the poppet causes the hydraulic cylinder to become unstable and bounce or "chatter" as the load is lowered.

SUMMARY OF INVENTION

The present invention provides a check seat assembly comprising a check valve seat with a by-pass passage in parallel with a check valve passage of the check seat assembly to meter flow and maintain stability of a hydraulic system, such as a hydraulic cylinder. In this manner, the chatter referenced above is prevented. The check valve may comprise an o-ring seated in a V-shaped groove.

The check seat assembly may allow flow from a pump to a hydraulic cylinder to freely pass through the check valve to pressurize one side of a piston of the hydraulic cylinder, such as a front side of the piston, to retract a corresponding rod connected to the piston. When the other side of the piston is pressurized, such as a back side of the piston to extend the rod, the piston reverses direction and the flow may be blocked by the check valve to be directed through a by-pass passage with a restrictive orifice. Directing the flow through the restrictive orifice reduces fluid pressure within the check valve seat to keep open a fluid flow path from the check valve seat to a pump inlet, thereby allowing the rod to extend smoothly.

An aspect of the invention may be a check valve. In exemplary embodiments, the check valve may include a check valve seat formed by a body of the check valve and having a seat portion surrounding a main flow passage for allowing flow in a first direction through the main flow passage. A check valve member is moveable between an open position and a closed position. The check valve further may include a secondary check valve passage in the body, the secondary check valve passage having a restriction member moveable between an open position and a closed position to allow flow in a second direction from the main flow passage of the seat portion. A by-pass passage is located in the body between the main flow passage of the body and an exterior of the body, the by-pass passage having a restrictive orifice and is in parallel with the secondary check valve passage. The check valve may be configured as a cartridge valve. The check valve further may be employed for controlling flow in a hydraulic actuator.

The foregoing and other features of the invention are hereinafter described in greater detail with reference to the accompanying drawings.

DETAILED DESCRIPTION

The principles of this present application have particular application to hydraulic actuators with a rod in tension while extending, such as a rod extending to lower a load, and thus will be described below chiefly in this context. It is also understood that principles of this invention may be applicable to other hydraulic assemblies where a hydraulic pump is unable to maintain fluid pressure at a level high enough to prevent a load holding valve from chattering.

Figure 1:
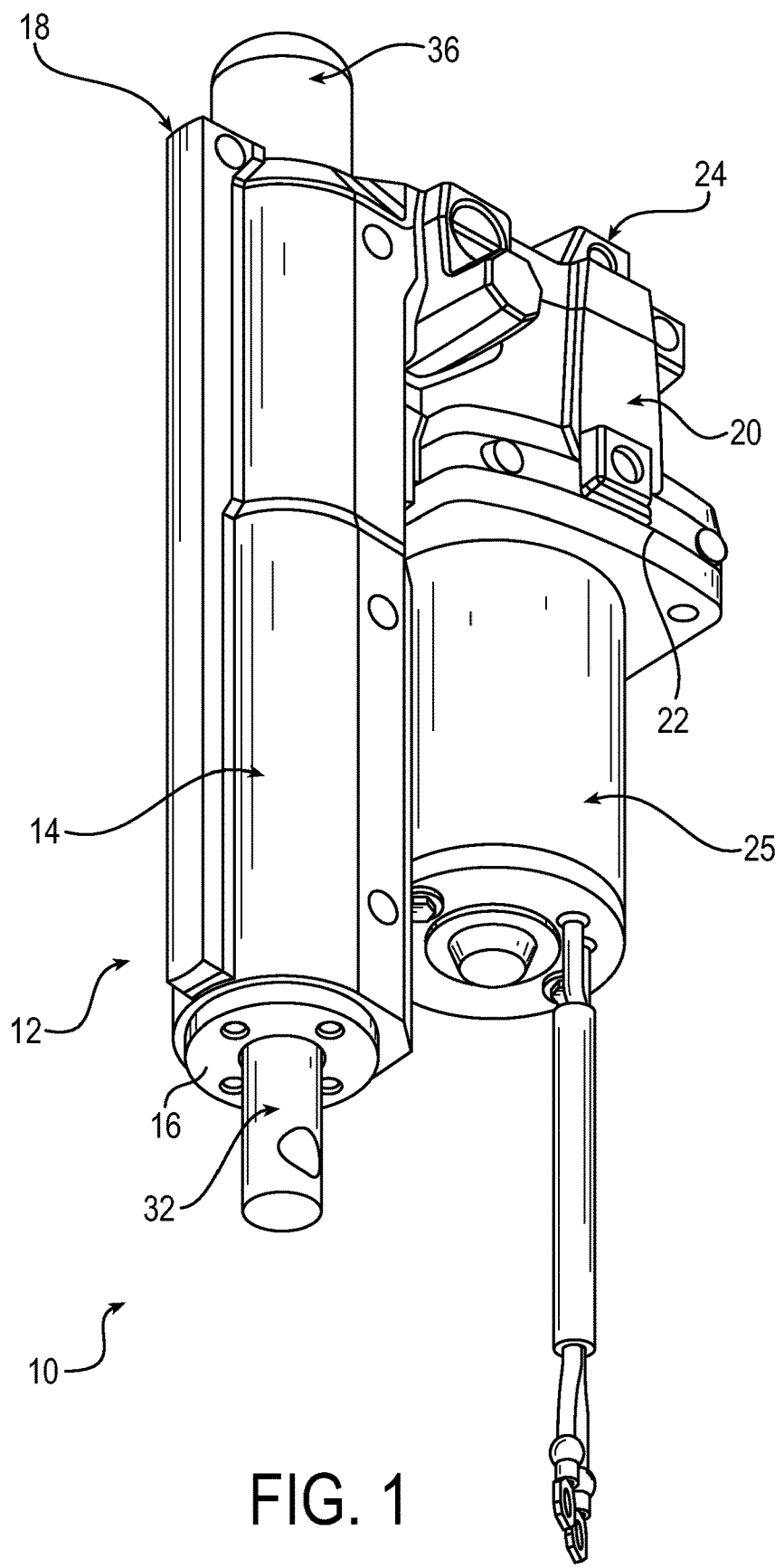
FIG. 1 is a perspective view of an exemplary hydraulic actuator.
Figure 2:
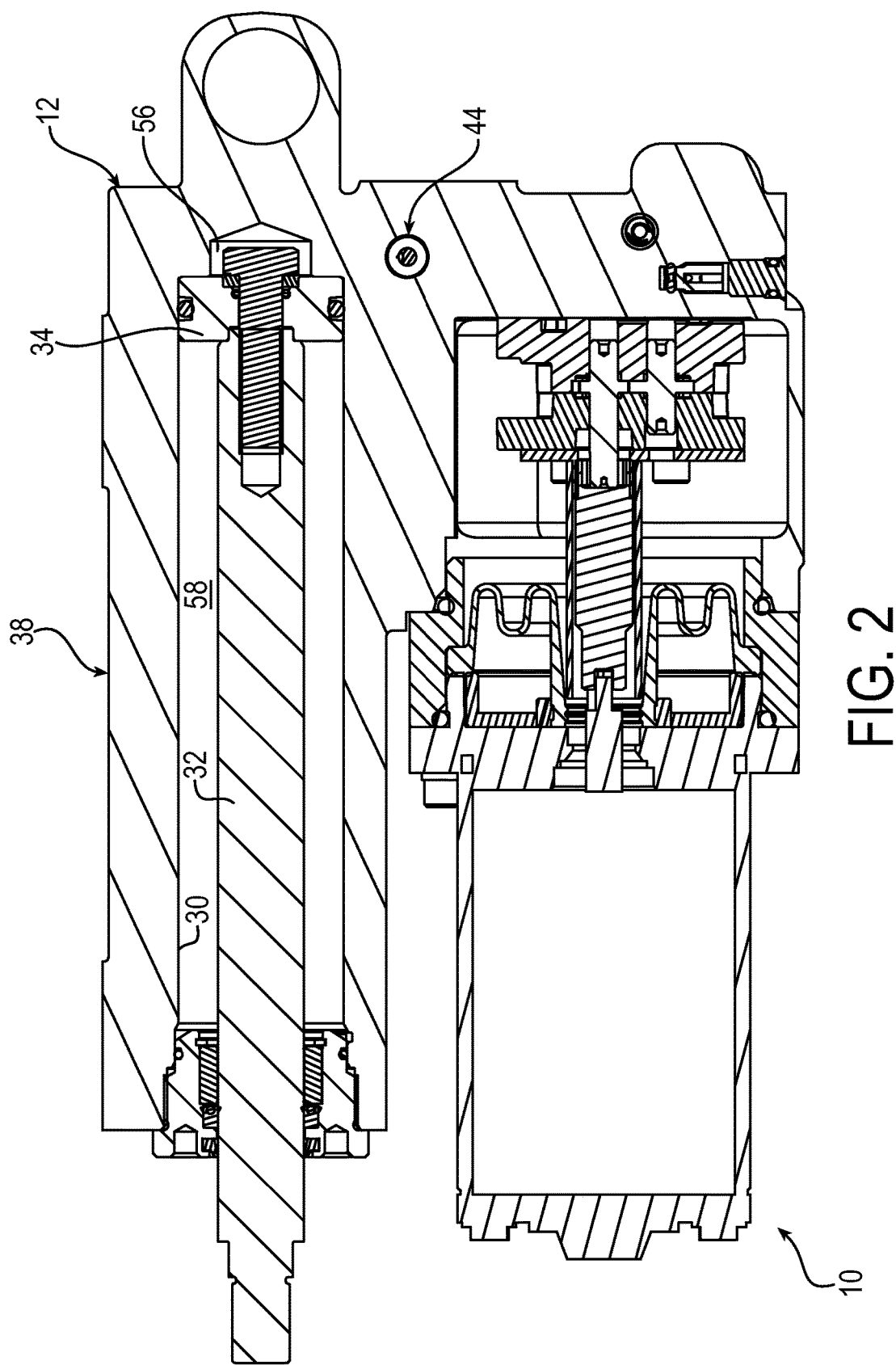
FIG. 2 is a cross-section view of the hydraulic actuator of FIG. 1.

FIGS. 1 and 2 illustrates an assembled electro-hydraulic actuator 10. As shown in FIG. 1, the electro-hydraulic actuator 10 includes a housing 12. The housing 12 includes an actuator portion 14 having opposite first and second ends 16 and 18, respectively, and a drive device portion 20 having opposite first and second ends 22 and 24, respectively. The actuator portion 14 and drive device portion 20 of the housing 12 are interconnected adjacent their respective second ends 18 and 24. Fluid flow conduits located internally in the housing 12 extend between the actuator portion 14 and the drive device portion 20. Flow control devices, such as valves, may be associated with these fluid flow conduits for controlling fluid flow through the housing.

The drive device portion 20 of the housing 12 supports the drive components of the electro-hydraulic actuator 10. The drive components include at least an electric motor 25 and a hydraulic pump 26. In an exemplary embodiment, the hydraulic pump 26 is a gear type pump that is located within the drive device portion 20 of the housing 12. Those skilled in the art will recognize that any one of various types of hydraulic pumps may be used. In the embodiment of FIG. 1, a reservoir 28 (see FIG. 3) may also be located within the drive device portion 20 of the housing 12 adjacent the second end 24. Also, as illustrated, the housing of the electric motor 25 extends outwardly of a first end 22 of the drive device portion 20 of the housing 12. A separate reservoir, such as a plastic reservoir, may be used with the electro-hydraulic actuator 10. Furthermore, the motor 25 may be located, if desired, within the drive device portion 20 of the housing 12, in which case the drive device portion may be elongated relative to that illustrated. For simplifying the packaging, the drive device portion 20 of the electro-hydraulic actuator 10 may include an integral reservoir 28 that is cast in the drive device portion during casting of the housing 12.

FIG. 2 is a cross-section view of the hydraulic actuator of FIG. 1. An interior surface of the actuator portion 14 of the housing 12 defines a cylinder bore 30 of the electro-hydraulic actuator 10. The cylinder bore 30 extends into the actuator portion 14 of the housing 12 from the first end 16 and terminates at an end wall located a spaced distance from the second end 18. Various sealing components and closure methods may be used for closing the opening to the cylinder bore 30 located on first end 16 of the actuator portion 14 and sealing about a rod 32, when installed. The cylinder bore 30 may be cast in the actuator portion 14 during casting of the housing 12 and later machined to a desired diameter.

Figure 3:
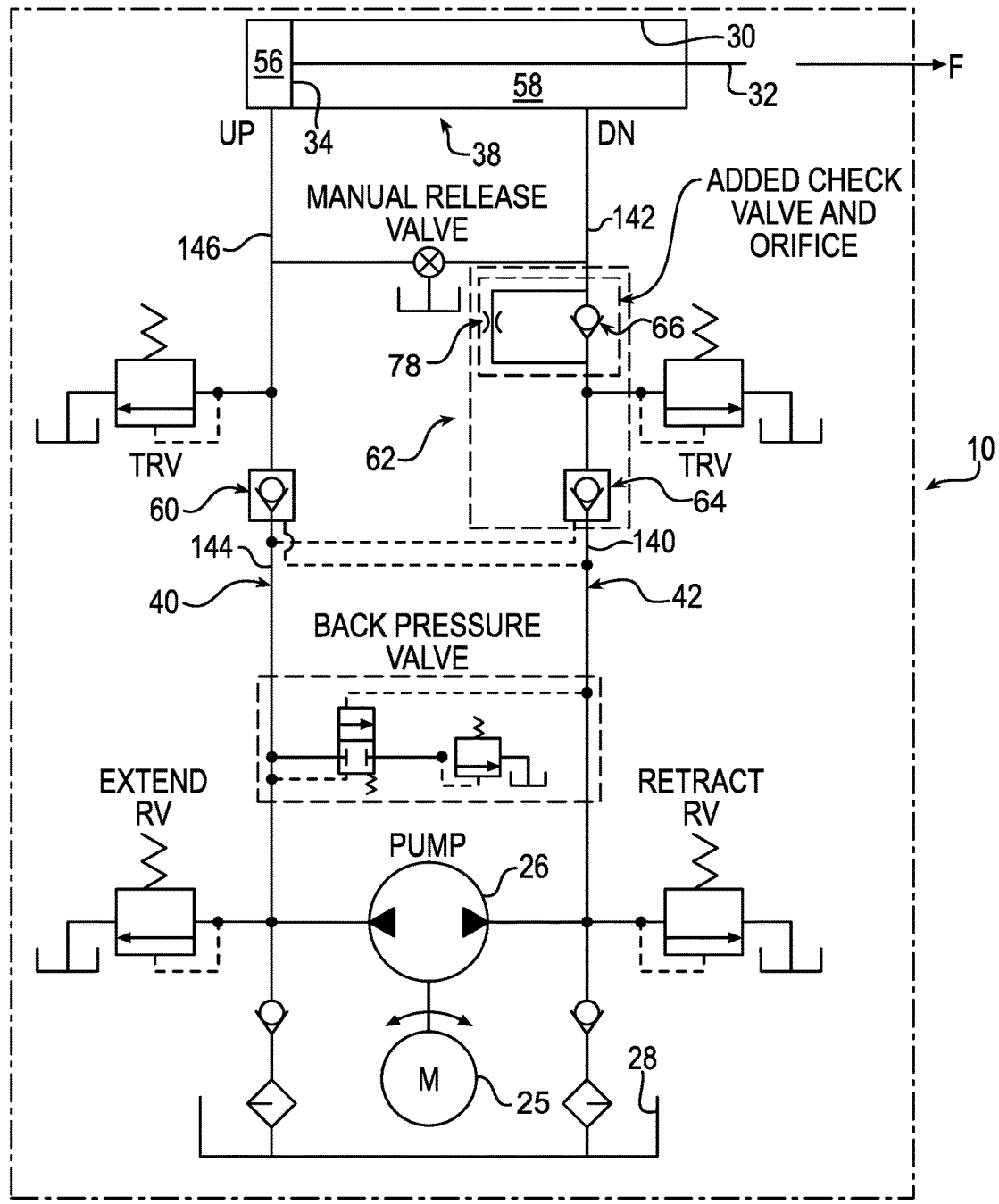
FIG. 3 is a circuit diagram representation of the hydraulic actuator of FIG. 1.

Turning to FIGS. 2 and 3, the actuator 38 is shown in a cross-section view and in a circuit diagram representation. The actuator 38 includes a piston 34 that is movably mounted within the cylinder bore 30 and a valve assembly 44. The piston 34 divides the cylinder bore 30 into first and second chambers 56 and 58, respectively. A rod 32 of the actuator 38, which is affixed to or integral to the piston 34, extends through the second chamber 58 and outwardly of a housing 12 (FIG. 1) of the electro-hydraulic actuator 10.

The piston 34 may be sealed by various known sealing methods for sealing the circumference of the piston 34 to prevent fluid flow between the first and second chambers 56 and 58. Movement of the piston 34 down, as viewed in FIG. 1, results in an extension of the rod 32 outwardly of the first end 16 of the actuator portion 14. For example, extending the rod 32 may lower a heavy load. Movement of the piston 34 upward, as viewed in FIG. 1, results in a retraction of the rod 32 relative to the first end 16 of the actuator portion 14 of the housing 12. For example, retracting the rod 32 may raise a heavy load.

A base member 36 extends outwardly of the second end 18 of the actuator portion 14 of the housing 12. Alternatively, the base member 36 may extend outwardly of the second end 24 of the drive device portion 20 of the housing 12. The base member 36 is a monolithic structure that is formed as one piece with the remainder of the housing 12. For example, the base member 36 may be formed as one piece with the housing 12 during a casting process in which the housing as a whole is formed. Typically, the housing 12 is cast from aluminum.

The electro-hydraulic actuator 10 includes the electric motor 25 that is operatively coupled to the hydraulic pump 26. The electric motor 25 is operable for driving the hydraulic pump 26 in opposite first and second rotational directions for driving the hydraulic pump. The hydraulic pump 26 draws fluid from the reservoir 28 and provides the fluid to an actuator 38 through a back side flow line 40 and a front side flow line 42.

The electro-hydraulic actuator 10 is operable for extending or retracting the rod 32 relative to the housing 12 for causing relative movement of two structures, one attached to the housing and the other attached to the rod. To extend the rod 32 of the electro-hydraulic actuator 10, the electric motor 25 is operated to drive the hydraulic pump 26 in a first rotational direction causing hydraulic fluid drawn from the reservoir 28 to be directed into the first chamber 56 of the actuator 38. The fluid directed into the first chamber 56 creates a pressure differential between the first and second chambers 56 and 58 of the actuator 38 that moves the piston 34 to increase the volume of the first chamber 56 and decrease the volume of the second chamber 58, thus extending the rod 32. To retract the rod 32, the electric motor 25 is operated to drive the hydraulic pump 26 in a second rotational direction, opposite to the first rotational direction, causing hydraulic fluid drawn from the first chamber 56 to be directed into the second chamber 58 of the actuator 38. The fluid directed into the second chamber 58 creates a pressure differential in which the pressure in the second chamber is higher than that in the first chamber 56. As a result of the differential pressure, the piston 34 moves to increase the volume of the second chamber 58 and decrease the volume of the first chamber 56, thus retracting the rod 32.

The electro-hydraulic actuator 10 may include a load holding valve, such as a cartridge valve or pair of cartridge valves comprising a back side pilot operated check valve 60 in series with the back side flow line 40, and a front side pilot operated check valve 62 in series with the front side flow line 42. The pilot operated check valves 60, 62 each has a pilot line fluidly connected to the other pilot operated check valve 60, 62 to allow back flow through one of the pilot operated check valves 60, 62 when pressure at the other reaches or exceeds a pressure threshold or ratio.

Turning briefly to FIG. 3, the illustrated embodiment of the pilot operated check valve 62 (an exemplary check valve assembly) includes a first check valve 64, a second check valve 66, and a restrictive orifice 78. The second check valve 66 and the restrictive orifice 78 are in parallel with one another and in series with the first check valve 64.

Figure 4:
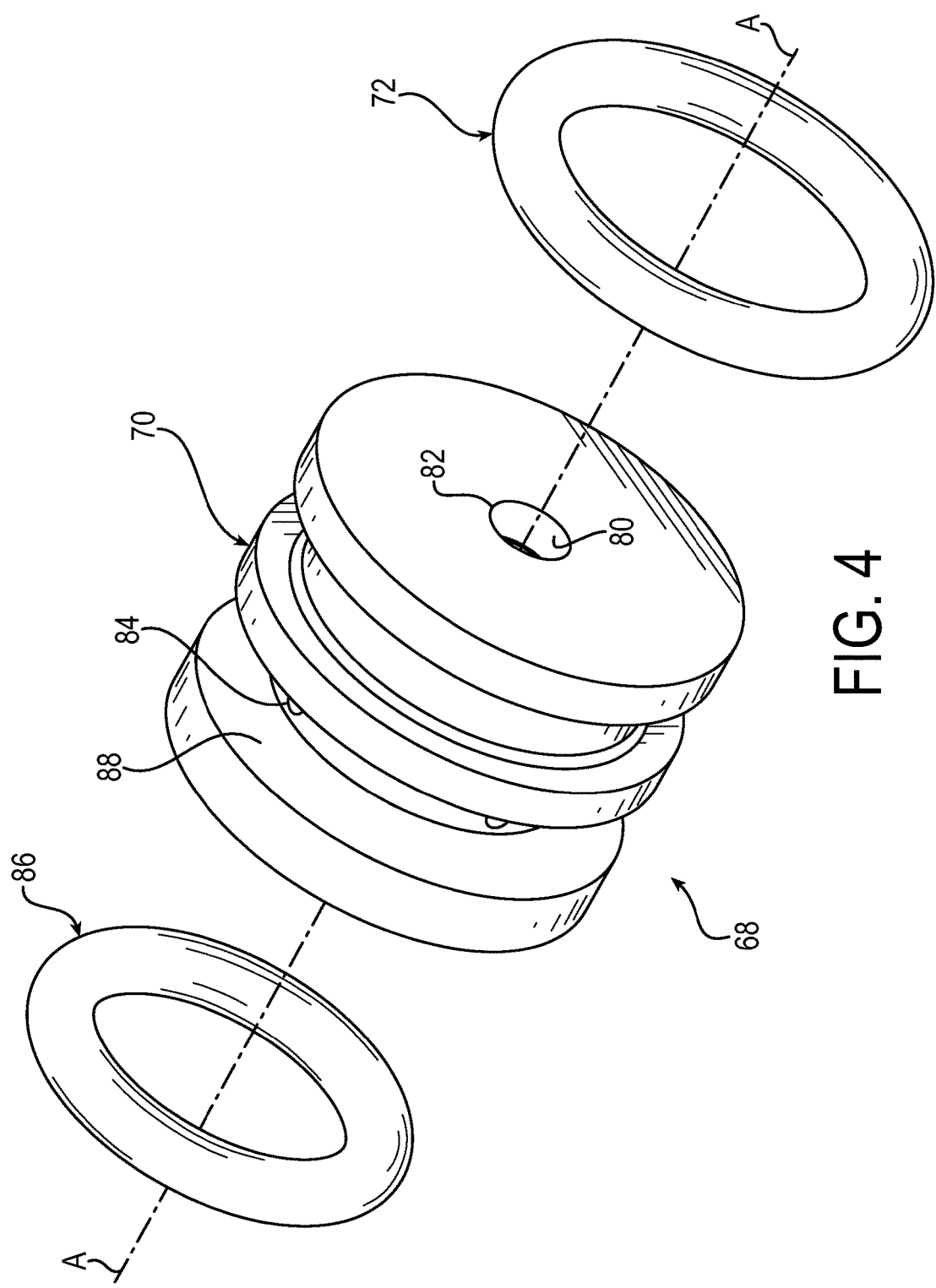
FIG. 4 is an exploded perspective view of an exemplary check seat assembly for use in the hydraulic actuator of FIG. 1.

Turning the FIGS. 4-8, and referring primarily to FIG. 4, an exemplary check seat assembly 68 is illustrated. The pilot operated check valve 62 may include the check seat assembly 68, which may include a check valve seat 70, an actuator seal 72, and a pair of side passages, such as a secondary check valve passage and a by-pass passage with the restrictive orifice 78 in parallel with the secondary check valve passage.

The check valve seat 70 may be generally cylindrical and include a seat portion 80 at an end for sealing against a check valve member, such as a poppet 110 (shown in FIG. 9), in a closed position. The seat portion 80 may surround a flow passage 82 coaxial with a longitudinal axis A to prevent flow through the flow passage 82 to or from an interior of the check valve seat 70 in the closed position.

When assembled (see FIG. 9) the secondary check valve passage may allow flow from the interior of the check valve seat 70 to an exterior, and may prevent flow from the exterior to the interior. The secondary check valve passage may include one or more through holes 84 to fluidly connect the interior to the exterior of the check valve seat 70, and may include a restrictive member, such as a seal 86, abutting a radially outward potion of each through hole 84. For example, the secondary check valve passage may be disposed adjacent the poppet 110 in a radial wall of the check valve seat 70.

The seal 86 may be seated in a V-shaped groove 88 leading from a radially outward portion of the check valve seat 70 to the through hole 84. For example, the seal 86 may include an o-ring that is expandable from each through hole 84 to allow fluid flow from the interior of the check valve seat 70, and contractible to seal against each through hole 84 to prevent fluid flow from the exterior of the check valve seat 70 through the through hole 84. During use, fluid may flow freely out of the interior of the check valve seat 70 through each through hole 84, and may be forced through the restrictive orifice 78 when flowing back into the interior. Preferably the seal 86 is made of a durable material such as polyurethane to allow repeated cycles of sealing and unsealing the through hole 84.

Figure 5:
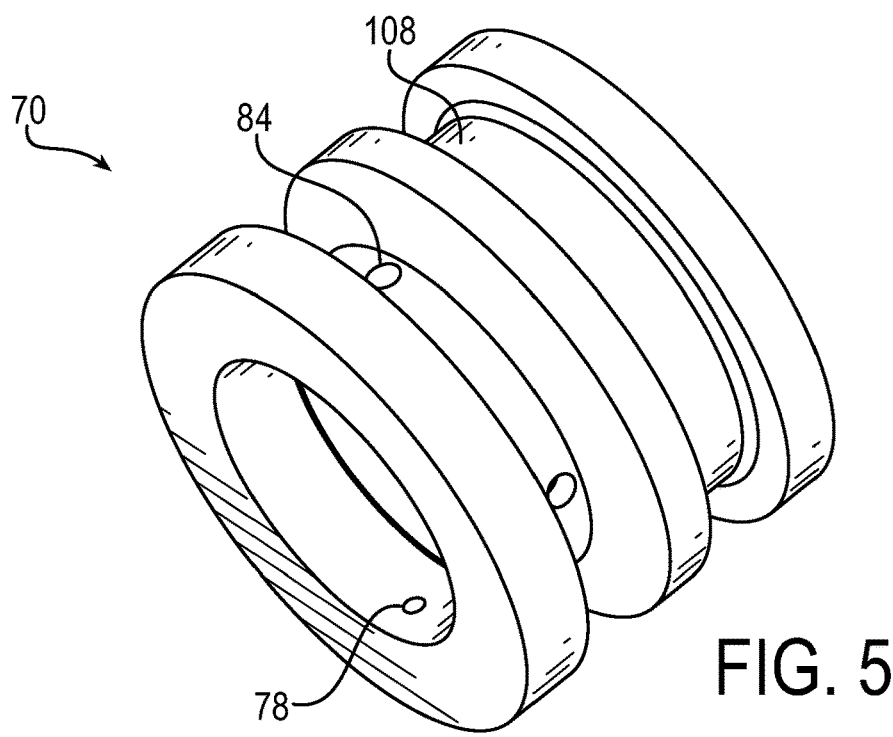
FIG. 5 is a perspective view of a check seat of the check seat assembly of FIG. 4.
Figure 6:
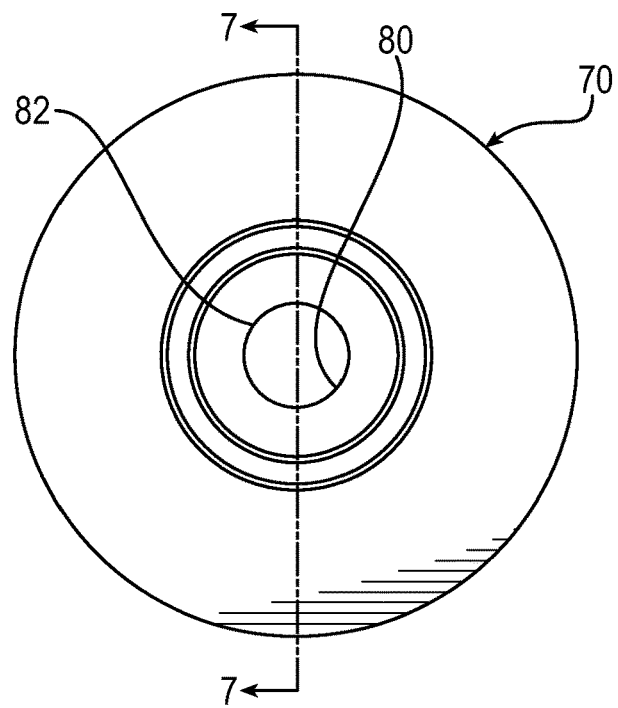
FIG. 6 is a top view of the check seat of FIG. 5.
Figure 7:
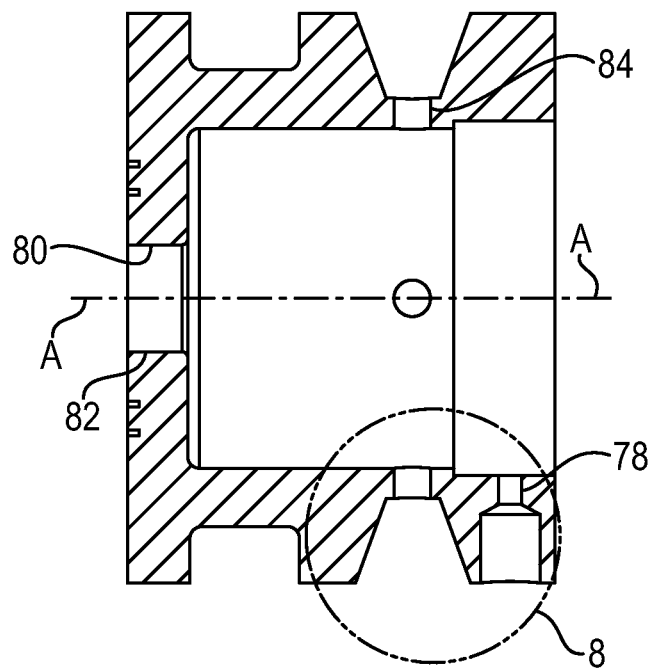
FIG. 7 is a cross-section view of a check seat of the check seat assembly of FIG. 6.
Figure 8:
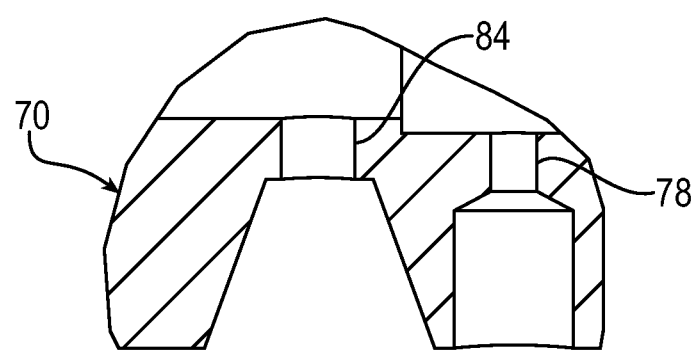
FIG. 8 is a partial cross-section view of the check seat assembly of FIG. 6.

Referring briefly to FIGS. 5, 7, and 8, the restrictive orifice 78 may be any suitable orifice that is configured to restrict fluid flow compared to fluid flow through the through holes 84. For example, the restrictive orifice 78 may include a reduced diameter portion that is fluidly connected with the exterior and the interior of the check valve seat 70 to restrict flow directed to the interior of the check valve seat 70 from an exterior of the check valve seat 70. The reduced diameter portion may have a cross-sectional area smaller than a total cross-sectional area of all through holes 84. For example, the cross-sectional area of the restrictive orifice 78 may be smaller than the cross-sectional area of a one of the through holes 84.

During use, fluid follows the path of least resistance. When fluid flows from the interior, the fluid may primarily flow through each through hole 84, and little or no fluid may flow through the restrictive orifice 78. In an embodiment, fluid flows only through each through hole and does not flow through the restrictive orifice. When fluid flows from the exterior to the interior of the check valve seat 70, the fluid may flow only through the restrictive orifice and may not flow through the through holes 84. In an embodiment, all of the fluid flows from the exterior to the interior through the restrictive orifice. In another embodiment, the restrictive orifice has a diameter of anywhere from 0.013" to 0.026".

Figure 9:
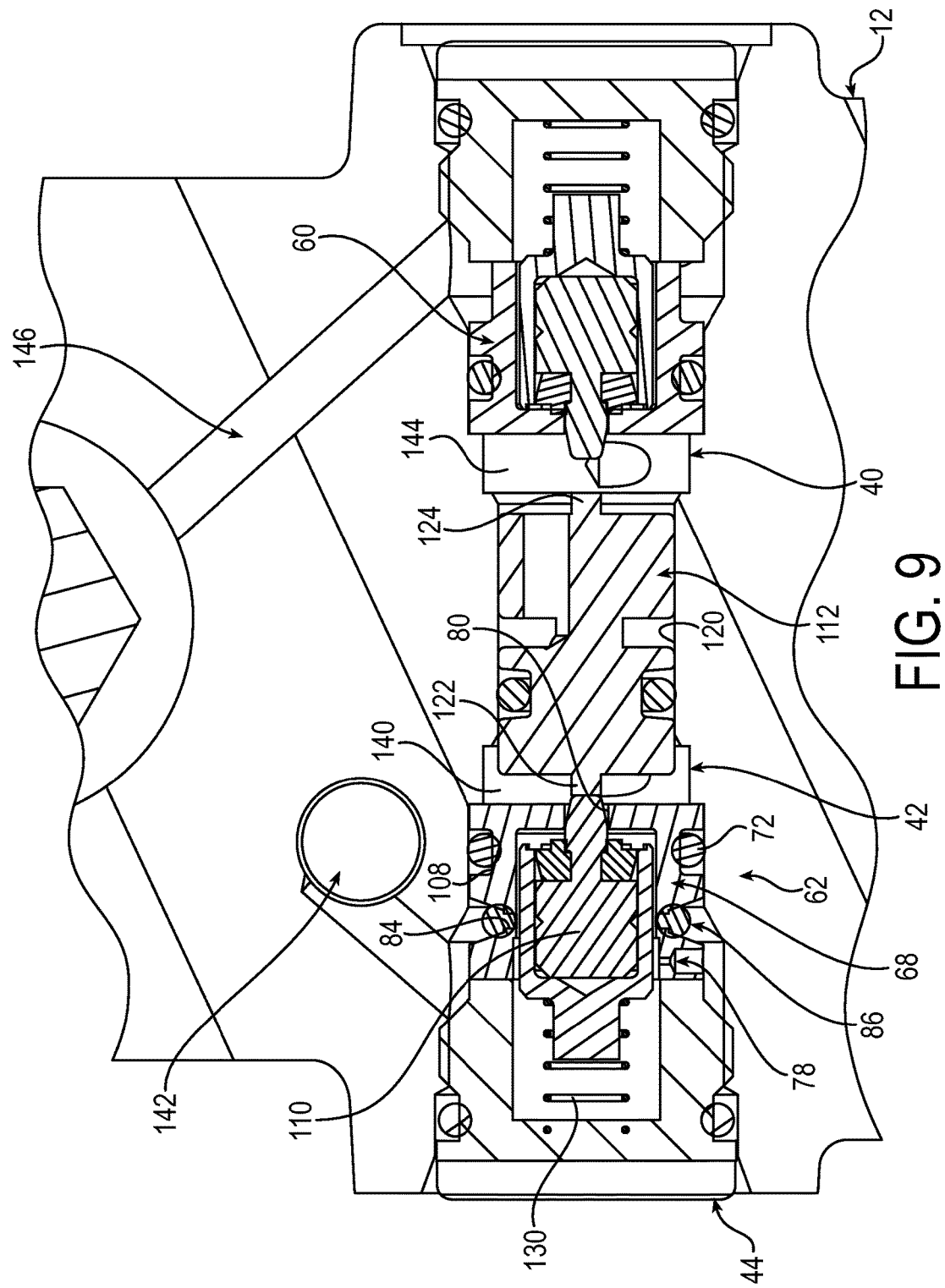
FIG. 9 is a partial cross-section view of the hydraulic actuator of FIG. 1.

Turning to FIG. 9, a partial cross-section view of the hydraulic actuator 10 is illustrated with the valve assembly 44. The valve assembly 44 may include the pilot operated check valves 60, 62.

The actuator seal 72 of the pilot operated check valve 62 may prevent axial fluid flow adjacent a radially outward portion of the check valve seat 70. For example, the actuator seal 72 may be seated in a radial groove 108 of the check valve seat 70 to prevent fluid flow between the housing 12 and the check valve seat 70. The actuator seal 72 may include an o-ring.

The back side pilot operated check valve 60 and the front side pilot operated check valve 62 may be similarly designed. In exemplary embodiments, the pilot operated check valve 60 may not include a secondary check valve passage or a restrictive orifice, but is otherwise comparable to the pilot operated check valve 62. In an embodiment, the pilot operated check valves are switched, such that the restrictive orifice and secondary check valve passage are fluidly connected to the front side flow line.

The poppet 110 is configured to seal against the seat portion 80 in a first position, and to block flow through the flow passage 82 and retract from the seat portion 80 in a second position to allow fluid flow therebetween. For example, the poppet 110 may include a reduced diameter portion that matches a diameter of the seat portion 80.

The pilot operated check valves 60, 62 may be opened by a spool or piston 112, which is mounted for axial movement in a bore 120. The piston 112 may be located between a fluid connection to the back side flow line 40 and a fluid connection to the front side flow line 42. The piston 112 includes extensions or tangs 122 and 124 at each end, which are positioned for axial movement between the flow passage 82 of each of the pilot operated check valves 60, 62. Movement of the piston 112 in either direction causes one of the tangs 122 or 124 to move into engagement with a corresponding poppet 110 to disengage the poppet 110 from the adjacent seat portion 80. Thus, the piston 112 may move the poppet 110 into a second or open position.

The pilot operated check valves 60, 62 may be opened if the pressure of the fluid in bore 120 behind the piston 112 is sufficient to overcome the force of a corresponding resilient member 130 plus the force on the corresponding poppet 110 to close by pressure in an actuator side portion 142 of the corresponding flow line 42 and the pressure in the opposite flow line 40, 42 acting on the opposite end of the piston 112. For example, when fluid under pressure enters through the back side flow line 40 at a greater pressure than the fluid entering the front side flow line 42, the piston 112 may open the pilot operated check valve 62. Fluid can then flow from the second chamber 58 through the front side flow line 42, through the restrictive orifice 78 and through the flow passage 82 to the pump 26. Directing flow through the restrictive orifice 78 allows the pressure in the front side flow line 42 to drop, and pressure acting on the pilot operated check valve 60 to communicate with the first chamber 56 (shown in FIG. 2) causing the rod 32 (shown in FIG. 2) to extend.

While extending, the rod 32 may be under a tension load. For example, the rod 32 may extend downward relative to the center of the earth to lower a weighted load. The tension load may cause the rod 32 and the corresponding cylinder to move at a rate at which the pump 26 cannot keep up adequate fluid flow, which may cause a pressure drop in the back side flow line 40. Without the restrictive orifice 78, the reduced pressure may allow the spring 130 and pressure in the actuator side portion 142 to close the poppet 110 until the pump 26 catches up and re-pressurizes the back side flow line 40. With the restrictive orifice 78, back flow from the second chamber 58 is reduced, which reduces pressure on a pump side portion 140 of the front side flow line 42 relative to the pilot operated check valve 62. Reducing the pressure reduces the likelihood of the poppet 110 closing.

The restrictive orifice 78 may also increase pressure in the actuator side portion 142 of the front side flow line 42. Increasing pressure on the actuator side portion 142 may slow the speed of the piston 34 extending the rod 32 to prevent the pressure in the back side flow line 40 from dropping. Maintaining the pressure in the back side flow line 40 allows the piston 112 to remain engaged with the poppet 110 of the pilot operated check valve 62 without chattering or repeatedly engaging and disengaging. Preventing chattering allows movement of the rod 32 to be controlled without the violent moving and stopping of chattering of the pilot operated check valve 62, allowing and preventing fluid to drain from the second chamber 58 in a more steady and controlled fashion.

While retracting, fluid pressure in the front side flow line 42 may overcome pressure in a pump side portion 144 the back side flow line 40 to force the piston 112 to engage and open the pilot operated check valve 60. Opening the pilot operated check valve 60 allows back flow from the first chamber 56 through an actuator side portion 146 of the back side flow line 40 to drain to the reservoir 28 (shown in FIG. 2) and/or the pump 26.

While the pilot operated check valve 60 is opened by the piston 112, the pressure in the front side flow line 42 may open the pilot operated check valve 62, and fluid may flow freely through the secondary check valve passage from the interior of the check valve seat 70 and through the actuator side portion 142 to the second chamber 58.

In an embodiment, the pilot operated check valves are switched to prevent chattering when the rod is under a compressive load. For example, the pilot operated check valve in series with the back side flow line may include the restrictive orifice in parallel with the secondary check valve passage. In an alternative embodiment, both pilot operated check valves may include a restrictive orifice in parallel with a secondary check valve passage.

An aspect of the invention is a check valve comprising a check valve seat formed by a body of the check valve and having a seat portion surrounding a main flow passage for allowing flow in a first direction through the main flow passage, a check valve member moveable between an open position and a closed position, a secondary check valve passage in the body, the secondary check valve passage having a restriction member moveable between an open position and a closed position to allow flow in a second direction from the main flow passage of the seat portion, and a by-pass passage in the body between the main flow passage of the body and an exterior of the body, the by-pass passage has a restrictive orifice and is in parallel with the secondary check valve passage.

The restrictive orifice may be configured to restrict flow directed to an interior of the check valve seat from an exterior of the check valve seat.

The secondary check valve passage may prevent flow from an exterior of the check valve seat to an interior of the check valve seat.

The secondary check valve passage may be disposed adjacent the poppet in a radial wall of the check valve seat.

The secondary check valve passage may include a through hole and a seal for sealing the through hole to prevent fluid flow in the first direction.

The seal may include an o-ring.

The check valve seat may further include a V-shaped groove in which the seal may be seated and extending from a radially outward portion of the check valve seat to the through hole.

The check valve member may include a poppet configured to seal against the seat portion in a first position and to block flow through the flow passage and to retract from the seat portion to a second position to allow fluid flow between the poppet and the seat portion.

The check valve may be pilot operated.

The check valve seat may further include a radial groove for receiving an actuator seal.

The check valve may further include an actuator seal in the radial groove for preventing fluid flow between an actuator housing and the check valve seat.

The actuator seal may include an o-ring.

A load hold valve may comprise the check valve.

A hydraulic actuator may comprise the check valve.

The hydraulic actuator may further comprise a hydraulic pump fluidly connected to a back side flow line and fluidly connected to a front side flow line, an actuator moveable in response to fluid flow from the back side flow line and the front side flow line, a pilot operated check valve fluidly connected in series with the back side flow line, and having a pilot line fluidly connected to the front side flow line, and the check valve of any one of claims 1-13 connected in series with the front side flow line, and having a pilot line fluidly connected to the back side flow line.

According to another aspect, a cartridge valve comprising a cartridge valve body having an interior through passage, a first side passage and second side passage, each side passage connecting an exterior of the cartridge valve body to an interior of the cartridge valve body, wherein the first side passage includes a check valve member for allowing flow from the interior through passage to the first side passage when in an open position, and for preventing flow from the first side passage to the interior through passage when in a closed position, wherein the second side passage has a flow restriction for restricting flow from the second side passage to the interior through passage, and the second side passage allows a flow rate less than the first side passage when in the open position.

The check valve member may include a moveable poppet for closing and opening the through passage.

The check valve member may include an o-ring seated adjacent the exterior of the cartridge valve body.

The first side passage may include a radially extending through hole disposed in a cylindrical side wall of the cartridge valve body.

The flow restriction may include a restrictive orifice with a cross-sectional area less than a cross-sectional area of a through hole of the first side passage when in the open position.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A check valve comprising:
   a check valve seat formed by a body of the check valve and having a seat portion surrounding a main flow passage for allowing flow in a first direction through the main flow passage;
   a check valve member moveable between an open position and a closed position;
   a secondary check valve passage in the body, the secondary check valve passage having a restriction member moveable between an open position and a closed position to allow flow in a second direction from the main flow passage of the seat portion; and by-pass passage in the body between the main flow passage of the body and an exterior of the body, wherein the by-pass passage has a restrictive orifice and is in parallel with the secondary check valve passage.

2. The check valve of claim 1, wherein the restrictive orifice is configured to restrict flow directed to an interior of the check valve seat from an exterior of the check valve seat.

3. The check valve of claim 1, wherein when the secondary check valve passage is closed, fluid cannot flow through the secondary check valve passage from an exterior of the check valve seat to an interior of the check valve seat.

4. The check valve of claim 1, wherein the secondary check valve passage is disposed adjacent the check valve member in a radial wall of the check valve seat.

5. The check valve of claim 1, wherein the secondary check valve passage includes a through hole; and wherein the restriction member includes a seal for closing the through hole such that when the seal closes the through hole fluid cannot flow opposite the second direction through the through hole.

6. The check valve of claim 5, wherein the seal includes an o-ring.

7. The check valve of claim 5, wherein the check valve seat further includes a V-shaped groove in which the seal is seated and extending from a radially outward portion of the check valve seat to the through hole.

8. The check valve of claim 1, wherein the check valve member includes a poppet configured to seal against the seat portion in a first position and to block flow through the flow passage and to retract from the seat portion to a second position to allow fluid flow between the poppet and the seat portion.

9. The check valve of claim 1, wherein the check valve is pilot operated.

10. The check valve of claim 1, wherein the check valve seat further includes a radial groove for receiving an actuator seal.

11. The check valve of claim 10, further including an actuator seal in the radial groove for preventing fluid flow between an actuator housing and the check valve seat.

12. The check valve of claim 11, wherein the actuator seal includes an o-ring.

13. A load hold valve comprising the check valve of claim 1.

14. A hydraulic actuator comprising the check valve of claim 1.

15. The hydraulic actuator of claim 14, further comprising:

a hydraulic pump fluidly connected to a back side flow line and fluidly connected to a front side flow line;

an actuator moveable in response to fluid flow from the back side flow line and the front side flow line;

a pilot operated check valve fluidly connected in series with the back side flow line, and having a pilot line fluidly connected to the front side flow line; and the check valve of claim 1 connected in series with the front side flow line, and having a pilot line fluidly connected to the back side flow line.

16. A cartridge valve comprising:

a check valve body having an interior through passage;

a first check valve member moveable between an open position where the interior through passage is open and a closed position where the interior through passage is closed;

a first side passage that fluidly connects an exterior of the check valve body to the interior through passage, wherein the first side passage includes a second check valve member;

a second side passage that fluidly connects the exterior of the check valve body to the interior through passage; and the second check valve member is moveable between an open position where the first side passage is open and a closed position where the first side passage is closed;

wherein the second side passage has a flow restriction for restricting flow from the second side passage to the interior through passage, and the second side passage allows a flow rate less than the first side passage when open.

17. The cartridge valve of claim 16, wherein the first check valve member includes a moveable poppet for closing and opening the interior through passage.

18. The cartridge valve of claim 16, wherein the second check valve member includes an o-ring seated adjacent the exterior of the check valve body.

19. The cartridge valve of claim 16, wherein the first side passage includes a radially extending through hole disposed in a cylindrical side wall of the check valve body.

20. The cartridge valve of claim 16, wherein the flow restriction includes a restrictive orifice with a cross-sectional area less than a cross-sectional area of a through hole of the first side passage when in the open position.

21. A check valve assembly comprising:

a check valve body;

a first check valve including a first fluid passage through the check valve body and a first check valve member, wherein the first check valve member is moveable between an open position where the first fluid passage is open and a closed position where the first fluid passage is closed;

a second check valve including a second fluid passage through the check valve body and a second check valve member, wherein the second check valve member is moveable between an open position where the second fluid passage is open and a closed position where the second fluid passage is closed; and a third fluid passage through the check valve body, wherein the third fluid passage includes a restrictive orifice;

wherein the second fluid passage and the third fluid passage are in parallel with one another and in series with the first fluid passage.

22. The check valve of claim 21, wherein the check valve assembly is pilot operated.

* * * * *